T. S. KEFFER.
AUTOMOBILE LOCK.
APPLICATION FILED MAY 1, 1913.
1,090,625.
Patented Mar. 17, 1914.
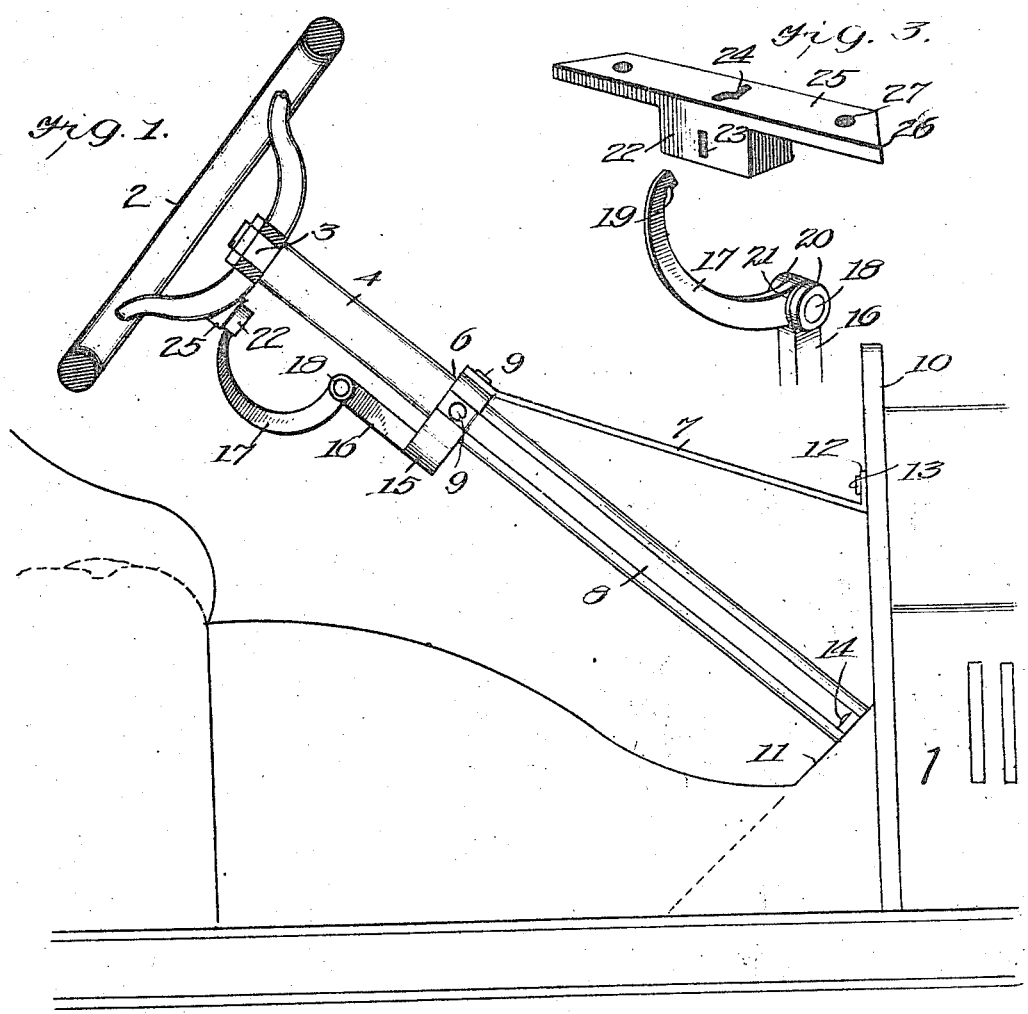
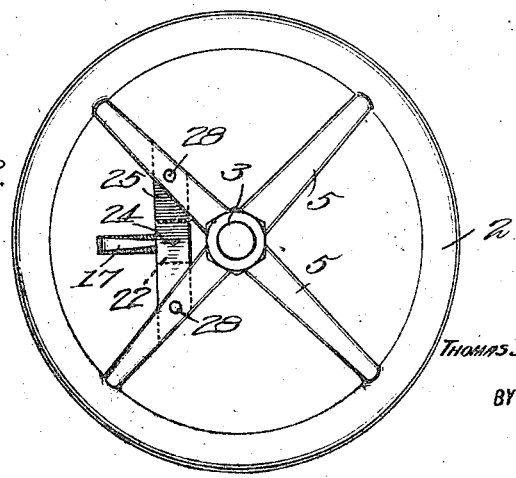
WITNESSES
F. C. Barry
C. E. Tranor
INVENTOR
Thomas Shillingsford Keffer
BY Munn & Co.
ATTORNEYS

UNITED STATES PATENT OFFICE.

THOMAS SHILLINGSFORD KEFFER, OF ATLANTIC CITY, NEW JERSEY.

AUTOMOBILE-LOCK.

1,090,625.

Specification of Letters Patent. Patented Mar. 17, 1914.

Application filed May 1, 1913. Serial No. 764,841.

*To all whom it may concern:*

Be it known that I, THOMAS S. KEFFER, a citizen of the United States, and a resident of Atlantic City, in the county of Atlantic and State of New Jersey, have made certain new and useful Improvements in Automobile-Locks, of which the following is a specification.

My invention is an improvement in automobile locks, and has for its object to provide a lock of the character specified, for use in connection with the steering wheels of automobiles and other motor vehicles, for preventing movement of the steering wheel by unauthorized persons, which may be applied to the steering wheel of any motor vehicle, without change in the wheel itself, and which when in operative position will absolutely prevent movement of the wheel, and when in inoperative position will not interfere with the operation of the wheel.

In the drawings: Figure 1 is a side view of a portion of an automobile provided with the improved lock, the wheel being in section, Fig. 2 is a top plan view of the wheel, and Fig. 3 is a perspective view of the lock proper.

The present embodiment of the invention is shown in connection with an automobile 1, having a steering wheel 2, connected to the steering post 3, which is arranged in the steering post sleeve 4. The rim of the wheel is connected to the steering post by spokes 5 in the usual manner, and the locking mechanism comprises a collar 6 which encircles the steering sleeve 4, at a convenient distance from the steering wheel, and the said collar is held in position by means of braces 7 and 8, each of the said braces being secured to the collar at one end by means of rivets 9 or the like, and to the dash board 10 at the rear of the hood and to the foot board 11.

The brace 7 is directly above the steering sleeve, and the end adjacent to the hood is provided with an angular lug 12, and the said lug laps against the rear face of the board 10, and is secured thereto by a screw or bolt 13. The braces 8 are at the sides of the sleeve, and each brace diverges laterally from the steering wheel, at the end remote from the sleeve, and the said end is secured to the foot board 11, by means of screws or bolts 14.

The collar 6 is provided with a radial extension 15, and a post or standard 16 extends upwardly from the extension 15, alongside the steering post sleeve. A bolt 17 of arc-shape is pivoted to the upper end of the post 16, by means of a pivot pin 18, and the free end of the bolt is provided with a notch 19, for engagement by a locking bolt in the lock casing to be presently described.

The upper end of the post 16 is provided with laterally spaced bearing lugs 20, and one end of the bolt 17 is received between the lug, and is pivoted thereto by means of the pivot pin 18, before mentioned. Washers 21 are arranged between each bearing lug 20 and the adjacent sides of the locking bolts, to prevent rattling of the said bolt in its bearing. The lock casing 22 is provided with a slot 23 in one face for receiving the notched end of the bolt, and with a key hole 24 for receiving a key to move the locking bolt, not shown, which engages the recess 19 of the bolt 17.

The lock within the casing 22 may be of any desired construction, but is preferably of such form that a particular form of key is necessary to operate the same. That is, the lock is preferably not of a simple construction, such that it may be easily picked or released without the use of the key belonging thereto.

The casing 22 is connected with a plate 25, the said plate being of greater length than the casing, and of a length to extend from one of the spokes 3 to an adjacent spoke, as shown in Fig. 2. The ends of the plate are beveled, as shown at 26, and near each end the plate has an opening 27 for receiving a rivet 28, or the like, for securing the said plate to the spoke of the wheel.

The key hole 24 is preferably arranged in the plate 25, in order that the said key hole may be easily accessible from the driver's seat. It will be understood that the improved lock may be arranged either as shown, that is at the lower side of the wheel, or at one side of the same or even above the steering post, according to the wishes of the owner of the car. When arranged as shown, as soon as the bolt 17 is released from the lock, the said bolt will fall downward into open position, by its own weight, so that it is only necessary to release the said bolt in order to release the wheel.

The collar 6 which supports the post 16 is preferably supported by braces, as shown, in order to release the steering post sleeve from any strain on the same. In use, the wheel is locked, by lifting the locking bolt until the recessed end thereof enters the slot 23. The lock is preferably a spring lock, so that the mere engaging of the locking bolt with the casing locks the said bolt in the casing. When it is desired to use the car, the key is inserted in the key hole 24 to release the bolt 17, and the said bolt falls of its own weight out of the lock casing and into inoperative position. The device may be applied to any car, without requiring any change in the car itself.

I claim:—

An attachment of the character specified, comprising a collar having a radial extension, a series of braces connected at one end to the collar and adapted for connection at the other end with the body of an automobile to support the collar on the sleeve of the steering post, a locking bolt supported by the post, and a lock casing having means for engagement by the bolt to lock the bolt to the casing, said casing having means whereby it may be secured to the steering wheel of the automobile.

THOMAS SHILLINGSFORD KEFFER.

Witnesses:
C. E. TRAINOR,
SOLON C. KEMON.